United States Patent [19]

Nozawa

[11] 4,348,913
[45] Sep. 14, 1982

[54] TRANSMISSION FOR A VEHICLE

[75] Inventor: Koji Nozawa, Higashikurume, Japan

[73] Assignee: Nissan Motor Company, Limited, Yokohama, Japan

[21] Appl. No.: 98,857

[22] Filed: Nov. 30, 1979

[30] Foreign Application Priority Data

Dec. 8, 1978 [JP] Japan ............................. 53-152172

[51] Int. Cl.³ ............................................ F16H 3/38
[52] U.S. Cl. ...................................... 74/339; 74/370; 192/53 B; 192/109 A
[58] Field of Search ............ 192/53 B, 109 A, 109 B, 192/53 R, 83 A, 99 A; 74/339, 340, 369, 370, 371, 372

[56] References Cited

U.S. PATENT DOCUMENTS

| 1,225,144 | 5/1917 | Land | 192/109 A |
| 1,719,188 | 7/1929 | Maybach | 74/370 |
| 1,720,989 | 7/1929 | Ahlm | 74/370 X |
| 1,898,190 | 2/1933 | Köhler | 192/67 R |
| 2,684,739 | 7/1954 | Hasbrouck | 192/109 A X |
| 3,910,131 | 10/1975 | Richards | 192/109 B X |
| 3,924,484 | 12/1975 | Richards | 74/372 X |

FOREIGN PATENT DOCUMENTS

| 578901 | 6/1933 | Fed. Rep. of Germany . |
| 142956 | 4/1935 | Fed. Rep. of Germany . |
| 680423 | 8/1939 | Fed. Rep. of Germany . |
| 827903 | 1/1952 | Fed. Rep. of Germany . |
| 766612 | 5/1953 | Fed. Rep. of Germany . |
| 1516915 | 2/1968 | France . |
| 298186 | 4/1929 | United Kingdom . |
| 523258 | 7/1940 | United Kingdom . |
| 677753 | 8/1952 | United Kingdom . |
| 720210 | 12/1954 | United Kingdom . |
| 884413 | 12/1961 | United Kingdom . |
| 1122274 | 8/1968 | United Kingdom . |
| 1210808 | 11/1970 | United Kingdom . |
| 1438194 | 6/1976 | United Kingdom . |

Primary Examiner—Leslie Braun
Assistant Examiner—Lawrence J. Gotts
Attorney, Agent, or Firm—Thompson, Birch, Gauthier & Samuels

[57] ABSTRACT

A transmission for an automotive vehicle, comprising a main shaft, a synchrohub fixedly supported by said main shaft, a forward gear rotatably supported by said main shaft next to one side of said synchrohub, a reverse gear rotatably supported by said main shaft next to the other side of said synchrohub, a first clutch gear integrally formed on a side of said forward gear, corresponding to said synchrohub, a second clutch gear integrally formed on a side of said reverse gear, corresponding to said synchrohub, a coupling sleeve slidably mounted on said synchrohub in the axial direction of said main shaft for engaging selectively with said first or second clutch gear, a shift fork having one end portion which is positioned near said coupling sleeve with a predetermined range of relative motion available therebetween, for shifting said coupling sleeve in the axial direction of said main shaft, and spring means arranged between said coupling sleeve and said shift fork for biasing said shift fork, relative to said coupling sleeve, to an intermediate position in said range.

4 Claims, 5 Drawing Figures

FIG. IA
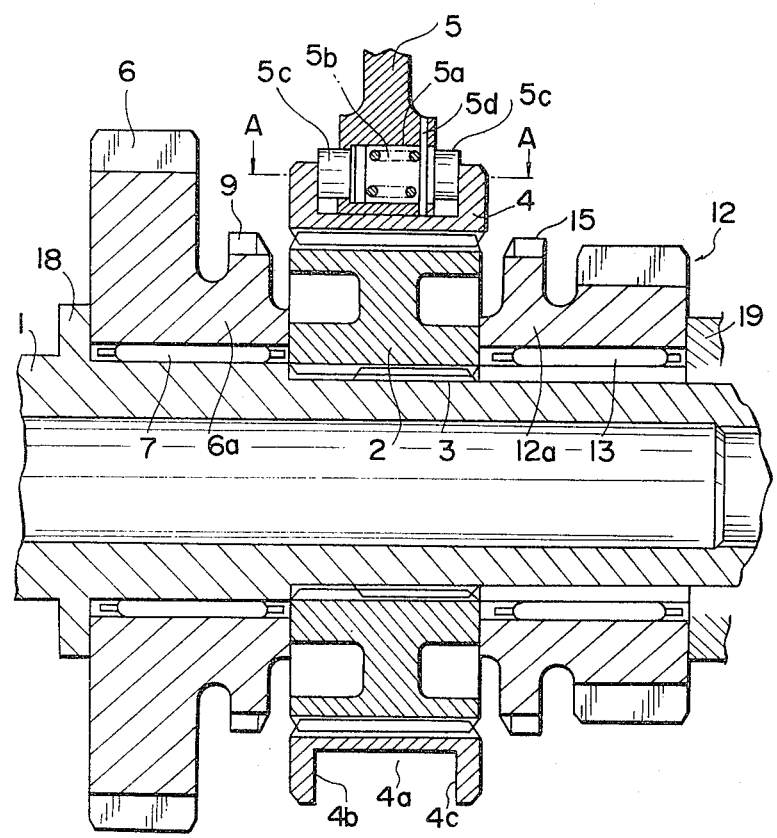

TRANSMISSION FOR A VEHICLE

BACKGROUND OF THE INVENTION

The present invention relates to a transmission, and more particularly, to a transmission suitable for use in working vehicles such as fork lift trucks and the like.

So called constant mesh structures are employed in a transmission for vehicles such as fork lift trucks and the like wherein the speeds range from 10 to 20 Km/h and wherein gear changes between forward and reverse gears often occur. In such constant mesh structures, a synchrohub is fixed on a main shaft between the forward and the reverse gears, which are rotatably supported on the main shaft. Clutch gears are provided integrally on the forward and reverse gears, respectively, corresponding to the synchrohub. A coupling sleeve is slidably engaged with the synchrohub. When gear changing is required, the shift lever is operated to move the shift fork so as to shift the coupling sleeve toward the forward gear or reverse gear. As a result, the forward gear or reverse gear is connected through the coupling sleeve with one of the clutch gears.

In such vehicles, forward or reverse gear changes often occur, and the operation of the gear changes frequently starts while the clutch is released but without the vehicle being stopped. If the vehicle does not stop completely, the main shaft continues to rotate together with the clutch disc, due to the inertia thereof while the gear changing operation is commencing. However, the forward and reverse gears rotate in opposite directions, so that the rotational speed difference between them is relatively large, as compared with the transmission for an average passenger car. For example, the rotational speed difference in such vehicles between the coupling sleeve and the clutch gears may be 5-10 times as large as that in passenger cars. Under such conditions, if the coupling sleeve is forcibly engaged with the clutch gear for the forward or reverse gear, then gear change noise occurs, and the abrasion of the clutch gear and coupling sleeve is high. Sometimes the clutch gears are broken, and also the operational feeling is disagreeable.

If the synchronizing mechanisms generally used for passenger cars are employed in order to overcome such defects, the production cost becomes very high. In addition, because the rotational speed of the synchronized parts of working vehicles is high, with accompanying high abrasion, frequent changing of these expensive parts is required.

SUMMARY OF THE INVENTION

Therefore, it is an object of the present invention to provide a transmission for a vehicle subjected to many and repeated gear changes, in which gear changing may be made smoothly.

According to the present invention, there is provided a transmission for a vehicle, comprising a main shaft, a synchrohub fixedly supported by said main shaft next to one side of said synchrohub, a reverse gear rotatably supported by said main shaft next to the other side of said synchrohub, first clutch gear integrally formed on a side of said forward gear, corresponding to said synchrohub, a second clutch gear integrally formed on a side of said reverse gear, corresponding to said synchrohub, a coupling sleeve slidably mounted on said synchrohub in the axial direction of said main shaft for engaging selectively with said first or second clutch gear, a shift fork having one end portion which is positioned near said coupling sleeve with a predetermined range of relative motion available therebetween, for shifting said coupling sleeve in the axial direction of said main shaft, and spring means arranged between said coupling sleeve and said shift fork for biasing said shift fork, relative to said coupling sleeve, to an intermediate position in said range.

BRIEF DESCRIPTION OF THE DRAWINGS

FIG. 1A is a vertical section showing a transmission for a working vehicle according to a preferred embodiment of the present invention;

DETAILED DESCRIPTION OF THE PREFERRED EMBODIMENTS

Figure 1B:
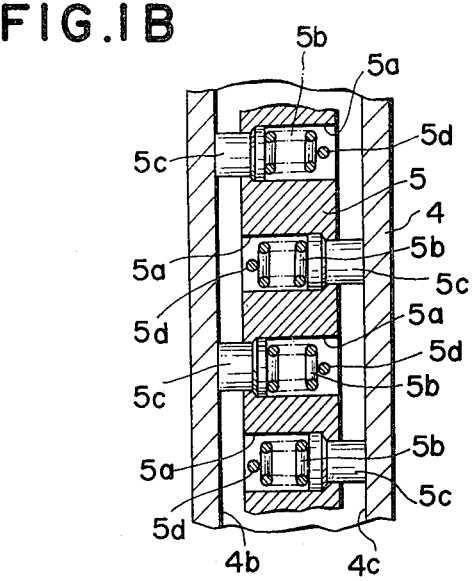
FIG. 1B is a sectional developed view of the transmission taken along the line A—A of FIG. 1A.

Referring now to FIG. 1A, a main shaft 1 is connected at its right portion to the clutch means. A synchrohub 2 is engaged through the splines 3 with the main shaft 1, so that the synchrohub 2 and the main shaft 1 may rotate together. A coupling sleeve 4 is in splined connection with the outer surface of the synchrohub 2 so that the coupling sleeve 4 is slidable in its axial direction but can not rotate about the synchrohub 2. A groove 4a is formed on the circumferential surface of the coupling sleeve 4. The lower portion of the shift fork 5 is placed in a groove 4a in a manner such that the driver may operate the shift lever 5 to shift the coupling sleeve 4.

As best shown in FIG. 1B, the lower portion of the shift fork 5 has a plurality of holes 5a parallel to the axis of the main shaft 1 in which slide pieces 5c made of a wear-resisting material are slidably contained. The slide pieces 5c are biased by springs 5b fitted between the back end of the slide pieces 5c and pins 5d fixed in the holes 5a so that the front ends of the slide pieces 5c project from the holes 5a and rests against the side walls 4b, 4c of the groove 4a. The front ends of the slide pieces 5c are positioned alternately to the right and left hands in the figure. It is preferable that the slide pieces 5c and the holes 5a are formed in a stepped configuration to each other in order to prevent the slide pieces 5c from coming out from the holes 5a.

On one side of the synchrohub 3, the forward gear 6 is rotatably supported by means of a bearing 7 on the main shaft 1. A clutch gear 9 is formed on a sleeve 6a projecting from one side of the clutch gear 9 toward the synchrohub 2.

On the other side of the synchrohub 2 a reverse gear 12 is rotatably supported on main shaft 1 by means of a bearing 13. Integrally projecting from the left side of the reverse gear 13 is a sleeve 12a on which another clutch gear 15 is formed.

The left side of the forward gear 6 is in contact with a shoulder 18 on main shaft 1, while the right side of the reverse gear 12 is in contact with another shoulder 19.

The synchrohub 2 is placed between the forward and reverse gears 6 and 12.

In operation, FIG. 1A shows the neutral position of the transmission. Even after the clutch (not shown) is released, the main shaft 1 continues to rotate due to its inertia at the neutral position. The forward and reverse gears 6, 12 rotate in the opposite directions to one another through the counter gear. In such a condition, suppose that the driver operates the shift lever to displace the shift fork 5 toward the forward gear 6, thereby shifting the coupling sleeve 4 through the slide pieces 5c in the same direction. If the coupling sleeve 4 and the clutch gear 9 for the forward gear 6 rotate at the same speed, then the coupling gear 4 may become engaged with the clutch gear 9 smoothly.

Figure 2:
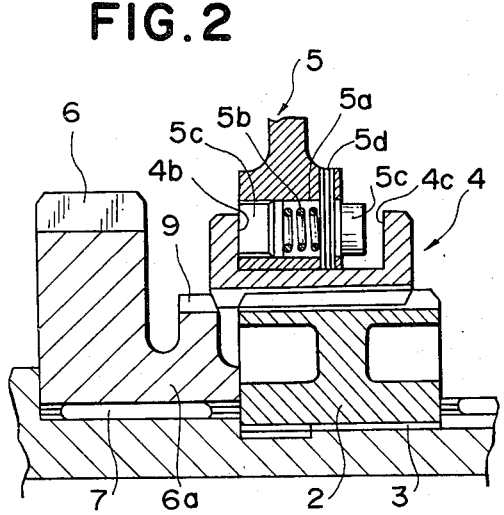
FIG. 2 is a vertical section of an essential part of the transmission as shown in FIG. 1A, showing the condition thereof in which the coupling sleeve is about to be engaged with the clutch gear.
Figure 3:
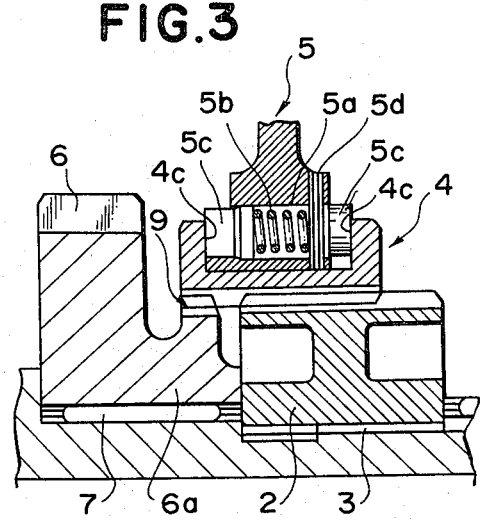
FIG. 3 is a vertical section of the same part as shown in FIG. 2 but showing the condition of the transmission in which the coupling sleeve is engaged with the clutch gear.

However, if they rotate at different speeds, then the coupling sleeve 4 and the clutch gear 9 can not engage smoothly. Consequently, as shown in FIG. 2, the coupling sleeve 4 does not move any more but the lower end of the shift fork 5 only moves so that the springs 5b are compressed to increase the biasing force. When their rotation speeds become substantially same, the coupling sleeve biased by the springs moves toward and engages with the clutch gear 9. FIG. 3 shows the engagement of the coupling sleeve 4 with the clutch gear 6.

As above mentioned, the coupling sleeve 4 and the clutch gear 9 do not engage with each other until they begin to rotate at substantially the same speed. Before their complete engagement, the shifting operation of the shift lever is finished.

The operation of engagement between the coupling sleeve 4 and the clutch gear 15 for the reverse gear 12 will not be described because it is substantially the same as that of the engagement between the coupling sleeve 4 and the clutch gear 9 for the forward gear 6, except for the direction of displacing the coupling sleeve 4 toward the reverse gear 12.

Figure 4:
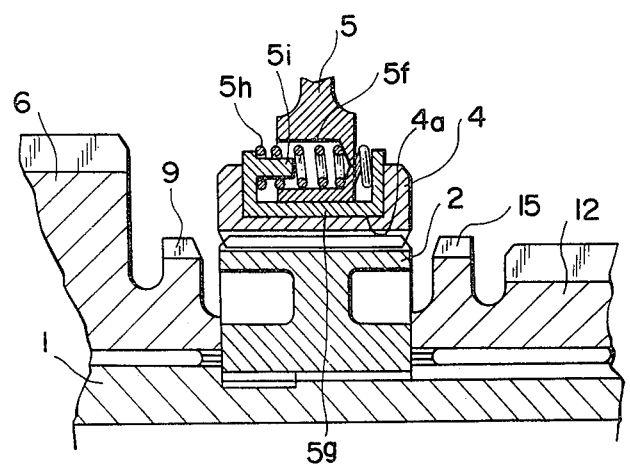
FIG. 4 is a vertical sectional view showing a transmission for a working vehicle according to another embodiment of the present invention.

FIG. 4 shows another embodiment of the present invention. The shift fork 5 has at its lower portion a plurality of blind bores 5f parallel to the axial direction of the main shaft, the open ends of which are positioned alternately to the right and left hands in the figure. Channel-shaped guide pieces 5g are fitted within the groove 4a of the coupling sleeve 4. The springs 5h are arranged between the side wall of the guide piece 5g and the bottom of the blind bores 5f. The projection 5f from the side wall of the guide piece 5g is provided for the purpose of preventing the spring 5h from moving out of position.

The operation of the second embodiment is substantially the same as that of the first embodiment although the slide pieces 5c and the guide pieces 5g are different in configuration.

According to the second embodiment of the present invention, the guide pieces may be easily produced with a simple structure, if they are made of synthetic resin such as for example polytetrafluorethylene available under the trade name of Teflon.

As can be easily understood from the foregoing, according to the present invention noise occuring at gear changing can be minimized because the coupling sleeve is pressed to the clutch gear by the biasing force of the spring when the former is just to be engaged with the latter. After engagement of these, the synchrohub is reliably engaged through the coupling sleeve with the clutch gear. This is very advantageous from the viewpoint of the strength of the mechanism. If there is set enough room for the stroke of the shift fork, the gear change can be smoothly and surely made regardless of the abrasion of the slide pieces and the guide pieces by the coupling sleeve, resulting in good durability.

What is claimed is:

1. A transmission for an automotive vehicle, comprising:

a main shaft;

a synchrohub fixedly supported on said main shaft;

a forward gear rotatably supported on said main shaft on one side of said synchrohub;

a reverse gear rotatably supported on said main shaft on the side opposite to the said one side of said synchrohub;

a first clutch gear integrally formed on a side of said forward gear adjacent to the said one side of said synchrohub;

a second clutch gear integrally formed on a side of said reverse gear adjacent to the said opposite side of said synchrohub;

a coupling sleeve mounted on said synchrohub for movement along said main shaft to effect selective engagement with said first or second clutch gears, said coupling sleeve having a circular external groove;

a shift fork having one end portion which is received in the circular external groove of said coupling sleeve with a predetermined range of relative motion available therebetween, for shifting said coupling sleeve along said main shaft, the said one end of said shift fork having a plurality of holes therein which are parallel to said main shaft;

springs received in said holes; and slide pieces having oppositely disposed back and front ends, the back ends of said slide pieces being received in said holes and being biased by said springs and the front ends of said slide pieces abutting against the sides of said circular external groove, whereupon said shift fork is biased to an intermediate position in said range.

2. A transmission as defined in claim 1 in which said holes of said shift fork are arranged to face alternately in opposite directions so that said springs and said slide pieces also alternate in opposite directions.

3. A transmission for an automotive vehicle, comprising:

a main shaft;

a synchrohub splined to said main shaft for rotation therewith;

a forward gear rotatably supported on said main shaft on one side of said synchrohub;

a reverse gear rotatably supported on said main shaft on the side opposite to the said one side of said synchrohub;

an external first clutch gear integrally formed on a side of said forward gear adjacent to the said one side of said synchrohub;

an external second clutch gear integrally formed on a side of said reverse gear adjacent to the said opposite side of said synchrohub;

a coupling sleeve splined to and slidable on said synchrohub for reciprocal movement along said main shaft for engaging selectively said first clutch gear or said second clutch gear, said coupling sleeve and said first and second clutch gears having substantially equal external diameters;
a shift fork for shifting said coupling sleeve along said main shaft so as to engage said first clutch gear or said second clutch gear;
said coupling sleeve having a wide circular external groove of channel-shaped cross-section with opposed side walls between which an arcuate end of said shift fork is positioned;
a plurality of holes formed in the arcuate end of said shift fork and extending in parallel with said main shaft;
a plurality of springs received in said holes; and
a plurality of slide pieces each having oppositely disposed front and back ends, the back ends of said slide pieces being received in said holes and being biased by said springs, and the front ends of said slide pieces resting alternately on the opposite sides of said external groove so as to hold the arcuate end of said shift fork in an intermediate position within said external groove.

4. A transmission for an automotive vehicle, comprising:
a main shaft;
a synchrohub splined to said main shaft for rotation therewith;
a forward gear rotatably supported on said main shaft on one side of said synchrohub;
a reverse gear rotatably supported on said main shaft on the side opposite to the said one side of said synchrohub;
an external first clutch gear integrally formed on a side of said forward gear adjacent to the said one side of said synchrohub;
an external second clutch gear integrally formed on a side of said reverse gear adjacent to the said opposite side of said synchrohub;
a coupling sleeve splined to and slidable on said synchrohub for reciprocal movement along said main shaft for engaging selectively said first clutch gear or said second clutch gear, said coupling sleeve and said first and second clutch gears having substantially equal external diameters;
a shift fork for shifting said coupling sleeve along said main shaft so as to engage said first clutch gear or said second clutch gear;
said coupling sleeve having a wide circular external groove of channel-shaped cross-section with opposed side walls between which an arcuate end of said shift fork is positioned;
a plurality of holes formed in the arcuate end of said shift fork and extending in parallel with said main shaft;
a plurality of coiled springs received in said holes; and
a plurality of channel-shaped guide pieces fitted in said external groove and having a plurality of alternately arranged projections protruding in parallel with said main shaft into said springs, said guide pieces being biased by said springs to hold the arcuate end of said shift fork in an intermediate position within said external groove.

* * * * *